United States Patent Office 3,541,126
Patented Nov. 17, 1970

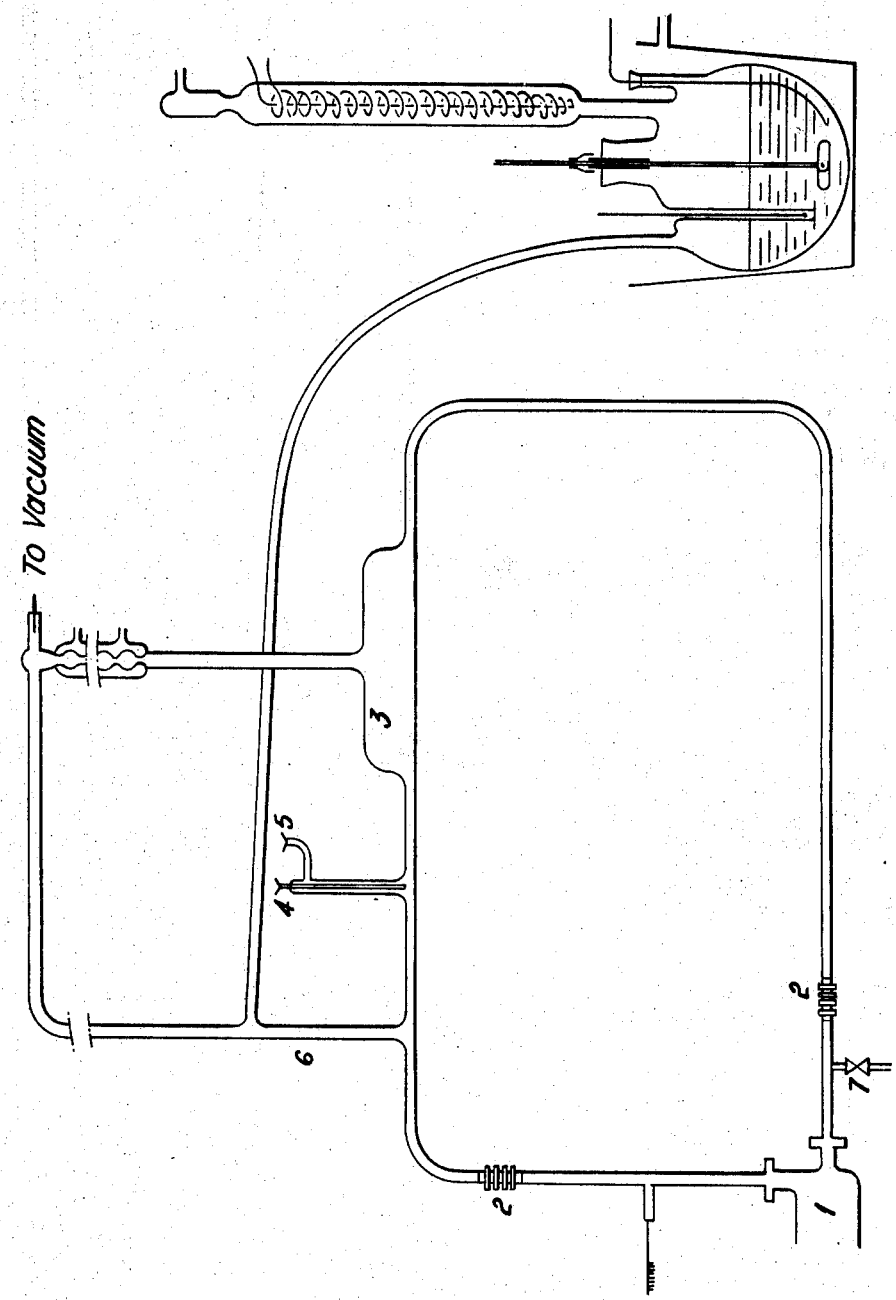

3,541,126
ORGANOTRISILOXANES AND THEIR
PREPARATION
Jean Henri Baronnier and Georges Pagni, Lyon, France,
assignors to Rhone-Poulenc S.A., Paris, France, a
French body corporate
Filed June 16, 1967, Ser. No. 646,700
Claims priority, application France, June 27, 1966,
67,109, Patent 1,491,413
Int. Cl. C07d 103/04; C07f 7/04, 7/18
U.S. Cl. 260—448.8                                    4 Claims

ABSTRACT OF THE DISCLOSURE

New trisiloxanes containing one or two hydroxyl groups attached to silicon, and useful inter alia in the production of silicone resins, are produced by the controlled inter-reaction of a dichlorosilane, a trichlorosilane, water, and an organic hydroxy-compound.

---

This invention relates to trisiloxanes and their preparation.

The present invention provides the trisiloxanes of the formula:

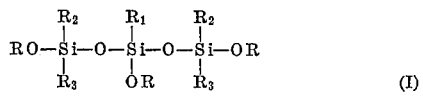

(I)

in which each of the symbols R, $R_1$ and $R_2$ represents a hydrogen atom or an organic radical at least one and at most two of the OR groups being hydroxyl groups, and $R_3$ represents an organic radical.

Trisiloxanes having three alkoxy or aryloxy groups bonded to silicon atoms have already been prepared. According to United States patent specification No. 2,821,518, such trisiloxanes may be prepared by hydrolysis of a mixture of two silanes, one having two groups of this type and the other having three such groups, the other valencies of the silicon atoms being satisfied by non-hydrolysable groups. Trisiloxanes of the aforesaid formula which simultaneously have hydroxyl groups and OR groups, R being an organic radical, have not previously been prepared.

In Formula I, the symbols $R_1$, $R_2$ and $R_3$ may represent, for example: alkyl of 1 to 4 carbon atoms (for example methyl, ethyl, propyl or butyl), alkenyl of 2 to 4 carbon atoms (such as vinyl, allyl or butenyl), alicyclic radicals (such as cyclopropyl, cyclobutyl, cyclopentyl cyclohexyl, and their alkylderivatives), aromatic radicals, which may or may not be substituted by halogen such as phenyl, tolyl or cumenyl and the corresponding radicals which bear chlorine atoms.

The symbol R may represent a hydrogen atom or an alkyl, cycloalkyl, aryl, aralkyl or alkoxyalkyl radical; where R is other than hydrogen, it may represent alkyl of 1 to 4 carbon atoms (such as methyl, ethyl, propyl or butyl), cyclopentyl, cyclohexyl, phenyl or benzyl radical, or a radical of the type —R'—O—R" in which R' is alkylene of 2 to 4 carbon atoms and R" is alkyl of 1 to 4 carbon atoms (for example methoxyethyl or ethoxyethyl). Especially valuable trisiloxanes of Formula I are those in which R is hydrogen, alkyl of 1 to 4 carbon atoms, phenyl, cyclohexyl or alkoxyalkyl of the formula —R'—O—R" in which R' is alkylene of 2 to 4 carbon atoms and R" is alkyl of 1 to 4 carbon atoms, $R_1$ and $R_2$ are each hydrogen alkyl of 1 to 4 carbon atoms or phenyl, and $R_3$ is alkyl of 1 to 4 carbon atoms or phenyl.

According to a feature of the invention, the trisiloxanes of Formula I are prepared by: (a) reacting, for a closely defined period, a mixture (i) containing in an inert organic medium, a dichlorosilane of formula $R_2R_3SiCl_2$ and a trichlorosilane of formula $R_1SiCl_3$ in a molar ratio $R_2R_3SiCl_2/R_1SiCl_3$ of 2, with a mixture (ii) consisting of water and a compound of formula ROH other than water containing essentially two mols of water and 3 to 20 mols of the compound ROH other than water per mol of trichlorosilane in mixture (i); (b) treating the crude resulting mixture with a neutralising agent to convert the SiCl groups into SiOH groups, until the mixture is neutral to bromothymol blue; and (c) isolating the trisiloxane compound produced. In step (a), the two mixtures are preferably simultaneously and separately introduced at ambient temperature, into a vigorously stirred inert diluent, preferably identical to the diluent used in mixture (i). During this reaction a greater or lessor proportion of the hydrochloric acid gas produced is eliminated from the medium by evaporation. In step (b) the crude trisiloxane so produced, which still contains residual hydrochloric acid gas and SiCl bonds, is passing into a medium containing a neutralising reagent which converts the residual SiCl bonds into SiOH bonds.

The concentration of the mixture of chlorosilanes in the diluent in mixture (i) is not critical within the limits of solubility of the chlorosilanes and of their reactivity towards the components of mixture (ii). A concentration of between 40 and 80% by weight relative to the total weight of mixture (i) appears to be optimal. The amount of water employed in mixture (ii) must be just sufficient to form the trisiloxane group

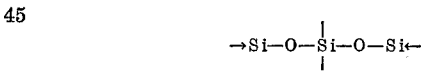

i.e., two mols of water for each mol of organotrichlorosilane, or at times a little less than 2 mols of water.

The term inert organic medium or diluent is used herein to refer to any organic diluent which is inert under the working conditions. In particular it is possible to use the usual aromatic diluents (such as benzene, toluene or xylene), aliphatic diluents, for example hexane or decane, cycloaliphatic diluents, for example cyclohexane or methylcyclohexane or aliphatic ethers, for example diethyl or dibutyl ether.

The whole operation may be carried out at ambient temperature or with cooling. In practice good results are obtained by maintaining the reaction media at a temperature of 0° to 30° C., but it is not necessary to regard these limits as strictly critical.

The implementation of the process of the invention does not create difficulties. It is possible to work simply by using two flasks A and B positioned one below the other; sufficient diluent is introduced into the higher flask A for the diluent to be level with a discharge overflow which communicates with flask B.

The amount of diluent introduced into flask A to assist in starting the formation of the trisiloxane chain must be sufficient to permit efficient stirring, good homogeneity of the mixture, and rapid dissipation of the heat generated by the cohydrolysis and condensation, and must not be so great as to dilute the reagents excessively. The volume of diluent initially introduced into flask A represents the useful volume of liquid circulating in the reactor and remains constant throughout the duration of flow of the reagents; it is thus principally subject to the demands of space and productivity.

The mixtures (i) and (ii) are then simultaneously and separately introduced into the flask A through tubes ending at the bottom of the flask. From the time that the reagents enter, the contents of flask A start to overflow into flask B which has previously been charged with the appropriate neutralizing reagent and optionally with a diluent.

Instead of being introduced all at once at the start, the neutralising reagent in question may be added continuously. The flask B is so chosen that it can contain the whole of the diluent and of the reagents employed in the first flask. Once all the reagents have been introduced into flask A, the contents of flask A are emptied into flask B. The reaction is considered ended when the contents of flask B are neutral to bromothymol blue. The contents of flask B are passed through a filter and the volatile products are removed from the filtrate by vacuum distillation. A product which consists principally of organotrisiloxanes of Formula I remains, and this can optionally be distilled in vacuo.

The flask A of the device described above may be replaced by a loop circuit with reagent inlets, a circulating pump, a gas-liquid separating chamber and an overflow, such as that described in French patent specification 1,077,230, or by any similar loop circuit, e.g., as described in Example 1 below. Such a circuit makes it possible to produce an intimate mixture of the reagents and allows large quantities of reagents to be treated continuously in a small volume. The operation of this circuit is easy. Sufficient of the diluent is introduced to make the circulating pump run at its normal working rate, and the reagents are then injected. The liquid flows into flask B from an overflow and treatment is continued as described above.

The useful volume of this loop circuit is not critical; it must satisfy the same requirements as the useful volume of flask A mentioned above, since it plays the same role.

The proportion of OH groups bonded to silicon atoms and of OR groups other than OH depends on the dwell time of the reagents in flask A (or in the loop circuit). The longer this contact time is, the more the compound ROH other than water enters into the reaction.

The trisiloxanes of Formula I may be used in the same way as other trifunctional trisiloxanes.

For example, they may be used to produce mixed organo-silicon resins by reaction with polyesters, bisphenol A/epichlorohydrin resins, melamine-formaldehyde resins, urea-formaldehyde resins, alkyd resins, polyethers, phenol-formaldehyde resins, cellulosic resins, polyurethanes, and acrylic resins and thus yield resins for the production of long-lasting coatings having high resistance to weathering, varnishes of high quality, paints which keep their gloss on aging, insulating layers for electrical equipment, adhesives, and adhesion primers which are stable at high temperatures.

The siloxanes may also be cohydrolysed and copolymerised with other organo-silicon, organo-metallic and organo-metalloid monomers to produce new polymers having the trisiloxane groups distributed along the chains and networks. It is also possible to rearrange them with organo-cyclopolysiloxanes or organo-polysiloxanes in the presence of a suitable catalyst. There may be used as additives in hot-vulcanisable elastomers, as plasticisers, or as modifiers of mechanical properties of the elastomers (improved tensile strength and tear strength). They may also be used for treating mineral fillers such as silica of high specific surface, titanium and aluminium oxides, or iron oxide, or as crosslinking agents for the preparation of cold-vulcanisable elastomers.

Since the compounds of Formula I simultaneously contain ether-oxide and hydroxyl functional groups, they can very easily combine with mineral or organic fillers having very weak reactive sites, and can under mild conditions react with organo-metallic compounds having mobile bonds such as Si—Cl, Ti—Cl, Sn—Cl or V—Cl. Equally, the SiH groups (when present) permit subsequent reactions inherent in the reactivity of these groups, such as addition to organic or organo-metallic unsaturated groups and the formation of Si—O—Si, —SiOH, Si—alkoxy and similar bonds.

The following examples illustrate the invention.

EXAMPLE 1

The apparatus used which is shown in the accompanying drawing comprises: (A) a hydrolysis loop circuit consisting of the following units: a glass tube of internal diameter 12 mm; a centrifugal pump 1 rotating at 2800 r.p.m. and providing a flow rate of 20 l/min.; on either side of the pump, polytetrafluoroethylene bellows couplings 2; a gas-liquid separating device 3 in the form of a glass cylinder 200 mm. long and 50 mm. in diameter, arranged horizontally, with its upper part connected by a tube to a water pump which provides a pressure reduction of several mm. Hg; tubes 4 and 5 for the entry of the reagents, connected to metering pumps not shown in the drawing; a tube 6 for removing the mixture to a finishing flask, connected to the same reduced pressure circuit as chamber 3; and an emptying tube 7; and (B) a 3-litre flask connected on one side to the tube 6 of the loop circuit and provided with a stirrer and a condenser operating under nitrogen.

The loop circuit is initially charged with 260 ml. of cyclohexane, which is the amount of liquid necessary to cause the centrifugal pump to turn at its normal speed and to reach the orifice of the overflow. 400 ml. of diethyl ether and 700 g. of sodium bicarbonate are introduced into flask B and the stirring is started.

The two solutions specified below are then introduced into the circuit simultaneously and separately over the course of 2 hours 45 minutes by means of two metering pumps:

1st solution.—total volume 1,320 ml. (via tube 4):
    Diphenyldichlorosilane—759 g. (3 mols)
    Phenyltrichlorosilane—317.25 g. (1.5 mols)
    Cyclohexane—450 ml.

2nd solution.—Total volume 264 ml. (via tube 5):
    Water—51. g. (2.85 mols)
    Methanol—172.5 g. (5.4 mols)

The temperature of the liquid within the circuit fluctuates between 15° and 20° C. The product produced in this circuit then progressively passes into flask B through the overflow.

After completing the running-in of the reagents, the centrifugal pump is stopped and the contents of the loop circuit are emptied into flask B. The mixture is stirred for a further 30 minutes at ambient temperature; it is then neutral to bromothymol blue and is filtered through a porous disc. The solvent, the excess methanol and the volatile products are then removed by heating under a reduced pressure of 5 mm. Hg. until the temperature within the mass is 75° C. 750 g. of a liquid product having the following physical properties remain:

Viscosity at 20° C.—395 cst.
$n_D^{20}$—1.558
$d_4^{20}$—1.12
OH—5.8% (weight)
OMe—4.9% (weight)

The product consists on average of molecules of the formula:

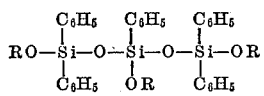

in which two of the OR groups are OH groups and the other is a OCH$_3$ group.

EXAMPLE 2

The same experiment is carried out under the same conditions and with the same amounts of reagents, but slowing down the speed of running-in of the reagents and hence increasing their contact time. In this way, with a running-in time of 4 hours 52 minutes, a product having the following percentages of functional groups is obtained:

|  | Percent weight |
|---|---|
| OH | 2.8 |
| OMe | 9.2 |

This essentially corresponds to the presence of one OH group and of two OCH$_3$ groups in the average trisiloxane molecule.

EXAMPLE 3

The procedure of Example 1 is followed, the reagents, their proportions and the contact times in the loop circuit being those indicated below:

| Experiment | Trichlorosilane R$_1$SiCl$_3$ (a) | Dichlorosilane (R$_2$)(R$_3$)SiCl$_2$ (b) | | Molar ratio, (b)/(a) | Molar ratio, water/ (b) | Molar ratio, alcohol/ water | Contact time, minutes |
|---|---|---|---|---|---|---|---|
| A | R$_1$=H | R$_2$=CH$_3$ | R$_3$=CH$_3$ | 2 | 0.95 | 7/1.9 | 15.5 |
| B | R$_1$=C$_6$H$_5$ | R$_2$=C$_6$H$_5$ | R$_3$=H | 2 | 0.95 | 7.8/1.9 | 24 |
| C | R$_1$=CH$_3$ | R$_2$=CH$_3$ | R$_3$=H | 2 | 0.95 | 7.8/1.9 | 30 |
| D | R$_1$=CH$_3$ | R$_2$=C$_6$H$_5$ | R$_3$=C$_6$H$_5$ | 2 | 0.95 | 7.2/1.9 | 45 |

The alcohol is n-butanol for experiment A and methanol for the other experiments. The properties of the products are as follows:

| Experiment | Physical properties | | | Alkoxy, percent (weight) | OH, percent (weight) | Average formula |
|---|---|---|---|---|---|---|
|  | $d_4^{20}$ | $n_D^{20}$ | $v_{20}$ (cst.) |  |  |  |
| A | 1.03 | 1.412 | 9.75 | 38.7 | 4.9 | RO—Si(CH$_3$)(CH$_3$)—O—Si(H)(OR)—O—Si(CH$_3$)(CH$_3$)OR with OR=OH or OC$_4$H$_9$ in the ratio 2/1. |
| B | 1.188 | 1.545 | 697 | 6.5 | 7.5 | RO—Si(C$_6$H$_5$)(H)—O—Si(C$_6$H$_5$)(OR)—O—Si(C$_6$H$_5$)(H)OR with OC=OH or OCH$_3$ in the ratio 2/1. |
| C | 1.110 | 1.405 | 97 | 24.8 | 7.6 | RO—Si(CH$_3$)(H)—O—Si(CH$_3$)(OR)—O—Si(CH$_3$)(H)OR with OR=OH or OCH$_3$ in the ratio 1/2. |
| D | 1.096 | 1.540 | 75 | 10.3 | 2.9 | RO—Si(C$_6$H$_5$)(C$_6$H$_5$)—O—Si(CH$_3$)(OR)—O—Si(C$_6$H$_5$)(C$_6$H$_5$)OR with OR=OH or OCH$_3$ in the ratio 1/2. |

EXAMPLE 4

A series of experiments is carried out as in Example 1, the reagents, proportions and contact times being as follows:

R$_1$SiCl$_3$ (a) CH$_3$SiCl$_3$
(R$_2$)(R$_3$)SiCl$_2$ (b) (C$_6$H$_5$)$_2$SiCl$_2$
Molar ratio (b)/(a) 2
Compound ROH other than water/H$_2$O 4.28
Molar ratio water/(b) 0.9
Contact time 2 hours The compound ROH other than water is:
    in experiment A phenol
    in experiment B CH$_3$—O—CH$_2$—CH$_2$OH
    in experiment C cyclohexanol The properties of the products are summarised in the following table:

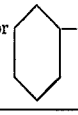

We claim:
1. Trisiloxanes of the formula:

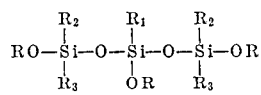

in which R is hydrogen, alkyl of 1 to 4 carbon atoms, phenyl, cyclohexyl or alkoxyalkyl of the formula —R'—Q—R" in which R' is alkylene of 2 to 4 carbon atoms and R" is alkyl of 1 to 4 carbon atoms, at least one and at most two of the OR groups being hydroxyl groups, $R_1$ and $R_2$ are each hydrogen, alkyl of 1 to 4 carbon atoms or phenyl, and $R_3$ is alkyl of 1 to 4 carbon atoms or phenyl.

2. A process for the preparation of a trisiloxane as claimed in claim 1, which comprises: (a) reacting, a mixture (i) containing, in an inert organic medium, a dichlorosilane of formula $R_2R_3SiCl_2$ and a trichlorosilane of formula $R_1SiCl_3$ in a molar ratio $R_2R_3SiCl_2/R_1SiCl_3$ of 2, with a mixture (ii) consisting of water and a compound of formula ROH other than water containing essentially two mols of water and 3 to 20 mols of the compound ROH other than water per mol of trichlorosilane in mixture (i); (b) treating the crude resulting mixture with a neutralising agent to convert the SiCl groups into SiOH groups, until the mixture is neutral to bromothymol blue; and (c) isolating the trisiloxane compound produced.

3. Process according to claim 2 in which the reactions are effected at 0° to 30° C.

4. Process according to claim 2 in which the concentration of chlorosilanes in mixture (i) is 40% to 80% by weight.

References Cited

UNITED STATES PATENTS

| | | | |
|---|---|---|---|
| 2,842,522 | 7/1958 | Frye | 260—448.8 X |
| 2,995,592 | 8/1961 | Peeler et al. | 260—448.8 |
| 3,122,579 | 2/1964 | Ceitheiser | 260—448.8 X |
| 3,274,288 | 9/1966 | Harris et al. | 260—448.8 X |
| 3,325,449 | 6/1967 | Ceyzeriat et al. | 260—448.8 X |

TOBIAS E. LEVOW, Primary Examiner

P. F. SHAVER, Assistant Examiner

U.S. Cl. X.R.

106—288, 299, 304; 260—37, 46.5, 429, 429.5, 429.7, 448.2